US011176170B2

(12) United States Patent
Luo et al.

(10) Patent No.: US 11,176,170 B2
(45) Date of Patent: Nov. 16, 2021

(54) BLOCKCHAIN-BASED DATA PROCESSING METHODS AND APPARATUSES AND COMPUTER DEVICES

(71) Applicant: Advanced New Technologies Co., Ltd., Grand Cayman (KY)

(72) Inventors: Ziyuan Luo, Hangzhou (CN); Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/161,636

(22) Filed: Jan. 28, 2021

(65) Prior Publication Data

US 2021/0157821 A1   May 27, 2021

Related U.S. Application Data

(63) Continuation of application No. PCT/CN2019/111588, filed on Oct. 17, 2019.

(30) Foreign Application Priority Data

Nov. 30, 2018 (CN) .......................... 201811453015.8

(51) Int. Cl.
*G06F 9/46* (2006.01)
*H04L 9/06* (2006.01)
(Continued)

(52) U.S. Cl.
CPC .............. *G06F 16/27* (2019.01); *G06F 9/466* (2013.01); *G06T 11/00* (2013.01); *H04L 9/0637* (2013.01); *H04L 67/10* (2013.01); *H04L 2209/38* (2013.01)

(58) Field of Classification Search
None
See application file for complete search history.

(56) References Cited

U.S. PATENT DOCUMENTS 10,135,835 B1 * 11/2018 Kandel ................... H04L 63/08
2014/0074583 A1 * 3/2014 Harvey ................... G06Q 30/06
705/14.39
(Continued)

FOREIGN PATENT DOCUMENTS

CN     105550373    5/2016
CN     106506203    3/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Joni Hsu
(74) *Attorney, Agent, or Firm* — Fish & Richardson P.C.

(57) ABSTRACT

One or more embodiments of the present specification provide blockchain-based data processing computer-implemented methods, non-transitory, computer-readable media, and computer-implemented systems. In an implementation, a computer-implemented method includes obtaining, by a first node device of a blockchain and from a distributed database of the blockchain, a target transaction that comprises state information of a target user. A data type of the state information and data content that corresponds to the data type of the state information is identified. A first graphical processing is performed on the data content that corresponds to the data type of the state information to obtain a state graphic that corresponds to the target user, where the first graphical processing is performed based on first predetermined data graphical processing logic that corresponds to the data type of the state information.

20 Claims, 4 Drawing Sheets

(51) Int. Cl.
   *H04L 29/08* (2006.01)
   *G06F 16/27* (2019.01)
   *G06T 11/00* (2006.01)

(56) References Cited

U.S. PATENT DOCUMENTS

| | | |
|---|---|---|
| 2018/0001184 A1 | 1/2018 | Tran et al. |
| 2018/0129945 A1 | 5/2018 | Saxena et al. |
| 2018/0211213 A1 | 7/2018 | Vivier |
| 2018/0314809 A1* | 11/2018 | Mintz ............... H04L 9/3236 |
| 2019/0377811 A1* | 12/2019 | Aleksander ............ G06F 9/466 |

FOREIGN PATENT DOCUMENTS

| | | |
|---|---|---|
| CN | 107317725 | 11/2017 |
| CN | 107592334 | 1/2018 |
| CN | 107908606 | 4/2018 |
| CN | 108447118 | 8/2018 |
| CN | 108520462 | 9/2018 |
| CN | 108769116 | 11/2018 |
| CN | 110046193 | 7/2019 |
| WO | WO 2018041066 | 3/2018 |
| WO | WO 2020108153 | 6/2020 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/111588, dated Jan. 16, 2020, 10 pages (with partial English translation).
EP Extended Search Report in European Application No. 19890040. 9, dated Aug. 3, 2021, 8 pages.

* cited by examiner

BLOCKCHAIN-BASED DATA PROCESSING METHODS AND APPARATUSES AND COMPUTER DEVICES

CROSS-REFERENCE TO RELATED APPLICATIONS

This application is a continuation of PCT Application No. PCT/CN2019/111588, filed on Oct. 17, 2019, which claims priority to Chinese Patent Application No. 201811453015.8, filed on Nov. 30, 2018, and each application is hereby incorporated by reference in its entirety.

TECHNICAL FIELD

The present specification relates to the field of data processing technologies, and in particular, to blockchain-based data processing methods and apparatuses and computer devices.

BACKGROUND

The blockchain technology is also referred to as a distributed ledger technology. It is a new technology that involves several computing devices in joint "ledger keeping" and joint maintenance of a complete distributed database. The blockchain technology features decentralization, openness, and transparency, allows each computing device to participate in database recording, and supports rapid data synchronization between the computing devices. Therefore, the blockchain technology has been widely applied in various fields.

SUMMARY

Based on the previous background, the present specification provides a blockchain-based data processing method, including: obtaining, by a node device of a blockchain from a distributed database of the blockchain, a target transaction that includes state information of a target user; identifying a data type of the state information and data content that corresponds to the data type; and performing graphical processing on the data content based on predetermined data graphical processing logic that corresponds to the data type, to obtain a state graphic that corresponds to the target user.

In another illustrated implementation, the method further includes: sending the state graphic to an end-user device of the target user, where the end-user device of the target user is a node device of the blockchain.

In another illustrated implementation, the identifying a data type of the state information and data content that corresponds to the data type, and performing graphical processing on the data content based on predetermined data graphical processing logic that corresponds to the data type, to obtain a state graphic that corresponds to the target user includes: invoking a smart contract for data graphical processing, and executing data identification logic and data graphical processing logic that are declared in the smart contract to perform data identification and data graphical processing on the state information of the target user, to obtain the state graphic that corresponds to the target user.

In another illustrated implementation, the state information of the target user includes name information of an organization that corresponds to the target user; and the identifying a data type of the state information and data content that corresponds to the data type, and performing graphical processing on the data content based on predetermined data graphical processing logic that corresponds to the data type, to obtain a state graphic that corresponds to the target user includes: identifying the data type of organization name and data content of the organization name; and performing graphical processing on the data content of the organization name based on predetermined data graphical processing logic that corresponds to the data type of organization name, to obtain a building graphic in the form of the first letter of the organization name and a name identifier that represents the organization, where the state graphic that corresponds to the target user includes the building graphic and the name identifier.

In another illustrated implementation, the state information of the target user further includes scale information of the organization that corresponds to the target user; and the identifying a data type of the state information and data content that corresponds to the data type, and performing graphical processing on the data content based on predetermined data graphical processing logic that corresponds to the data type, to obtain a state graphic that corresponds to the target user further includes: identifying the data type of organization scale and data content of the organization scale; and performing graphical processing on the data content of the organization scale based on predetermined data graphical processing logic that corresponds to the data type of organization scale, to obtain a population density form graphic that corresponds to the organization, where the state graphic that corresponds to the target user further includes the population density form graphic.

In another illustrated implementation, the state information of the target user further includes geographical location information that corresponds to the target user; and the identifying a data type of the state information and data content that corresponds to the data type, and performing graphical processing on the data content based on predetermined data graphical processing logic that corresponds to the data type, to obtain a state graphic that corresponds to the target user further includes: identifying the data type of geographical location and data content of the geographical location; obtaining a real-time weather state of the geographical location; and processing the real-time weather state into a weather state graphic based on predetermined data graphical processing logic that corresponds to the data type of geographical location, where the state graphic that corresponds to the target user further includes the weather state graphic.

In another illustrated implementation, the state information of the target user includes eigenvalue information of the target user, and the eigenvalue is used to represent credibility or activeness of the user.

Correspondingly, the present specification further provides a blockchain-based data processing apparatus, including: an acquisition unit, configured to obtain, from a distributed database of a blockchain, a target transaction that includes state information of a target user; an identification unit, configured to identify a data type of the state information and data content that corresponds to the data type; and a data graphical processing unit, configured to perform graphical processing on the data content based on predetermined data graphical processing logic that corresponds to the data type, to obtain a state graphic that corresponds to the target user.

In another illustrated implementation, the apparatus further includes: a sending unit, configured to send the state graphic to an end-user device of the target user, where the end-user device of the target user is a node device of the blockchain.

In another illustrated implementation, the identification unit and the data graphical processing unit are further configured to: invoke a smart contract for data graphical processing, and execute data identification logic and data graphical processing logic that are declared in the smart contract to perform data identification and data graphical processing on the state information of the target user, to obtain the state graphic that corresponds to the target user.

In another illustrated implementation, the state information of the target user includes name information of an organization that corresponds to the target user; and the identification unit and the data graphical processing unit are further configured to: identify the data type of organization name and data content of the organization name; and perform graphical processing on the data content of the organization name based on predetermined data graphical processing logic that corresponds to the data type of organization name, to obtain a building graphic in the form of the first letter of the organization name and a name identifier that represents the organization, where the state graphic that corresponds to the target user includes the building graphic and the name identifier.

In another illustrated implementation, the state information of the target user further includes scale information of the organization that corresponds to the target user; and the identification unit and the data graphical processing unit are further configured to: identify the data type of organization scale and data content of the organization scale; and perform graphical processing on the data content of the organization scale based on predetermined data graphical processing logic that corresponds to the data type of organization scale, to obtain a population density form graphic that corresponds to the organization, where the state graphic that corresponds to the target user further includes the population density form graphic.

In another illustrated implementation, the state information of the target user further includes geographical location information that corresponds to the target user; and the identification unit and the data graphical processing unit are further configured to: identify the data type of geographical location and data content of the geographical location; obtain a real-time weather state of the geographical location; and process the real-time weather state into a weather state graphic based on predetermined data graphical processing logic that corresponds to the data type of geographical location, where the state graphic that corresponds to the target user further includes the weather state graphic.

In another illustrated implementation, the state information of the target user includes eigenvalue information of the target user, and the eigenvalue is used to represent credibility or activeness of the user.

Correspondingly, the present specification further provides a computer device, including a storage and a processor, where the storage stores a processor executable computer program, and when executing the computer program, the processor performs the steps in the blockchain-based data processing method described above.

It can be seen from the previous technical solutions that the data processing methods and apparatuses provided in the present specification are used to perform graphical processing on the state information of the target user stored in the distributed database of the blockchain, to achieve differentiated graphical designs for user state information stored in the blockchain, thereby improving the visuality and variety of graphical display of blockchain data information. Consensus and anti-tamper algorithms of blockchains can be used ensure that the backup user state information stored in the distributed database of the blockchain shall not be tampered with after the user state information is provided, thereby ensuring the authenticity and security of the data information that the graphical processing is based on.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with one or more embodiments of the present specification. On the contrary, the implementations are only examples of apparatus and methods that are described in the appended claims in detail and that are consistent with some aspects of one or more embodiments of the present specification.

It is worthwhile to note that in other embodiments, steps of a corresponding method do not necessarily need to be performed in a sequence illustrated and described in the present specification. Methods in some other embodiments can include more or fewer steps than the methods described in the present specification. In addition, a single step described in the present specification may be divided into multiple steps for description in other embodiments, and multiple steps described in the present specification may alternatively be combined into a single step for description in other embodiments.

Figure 1:
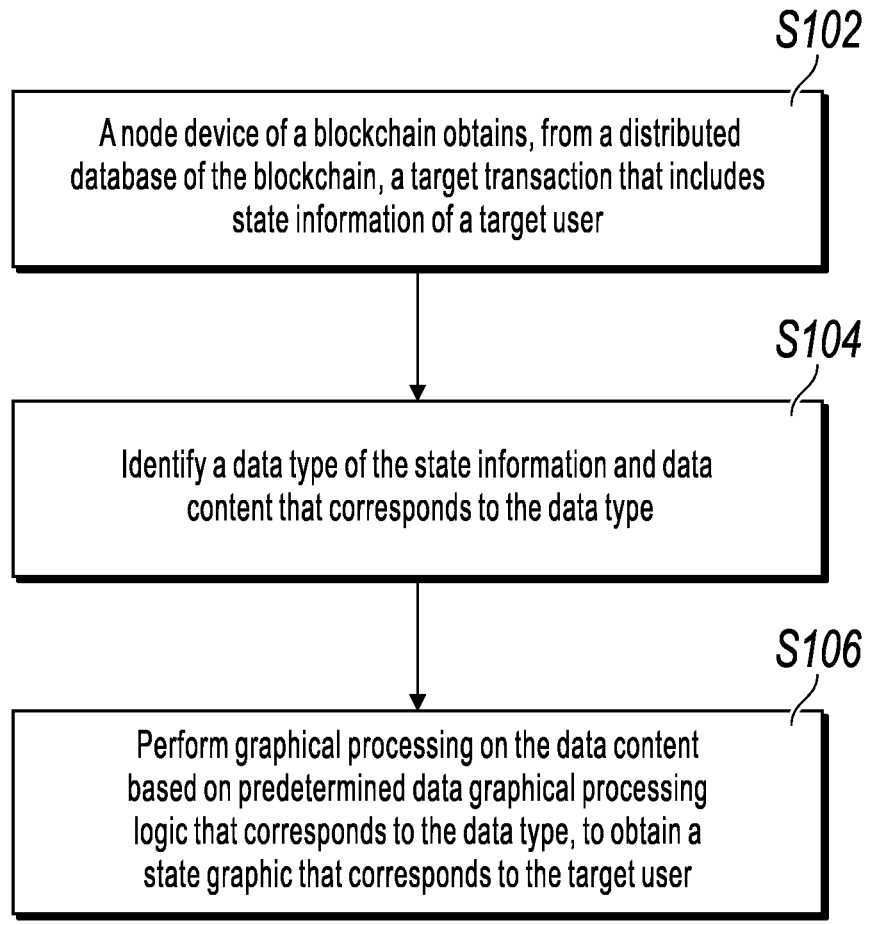
FIG. 1 is a flowchart illustrating a blockchain-based data processing method, according to an embodiment of the present specification.

FIG. 1 is a flowchart illustrating a blockchain-based data processing method, according to an example embodiment. The data processing method includes the following steps:

Step 102. A node device of a blockchain obtains, from a distributed database of the blockchain, a target transaction that includes state information of a target user.

The blockchain described in some embodiments can be specifically a peer-to-peer (P2P) network system that each node agrees on by using a consensus algorithm and that has a distributed data storage structure. Data in the blockchain is distributed on temporally consecutive "blocks", the current block includes the data abstract of the previous block, and full data backup of some or all nodes is implemented based on the specific consensus algorithm (for example, Proof Of Work, Proof Of Stake, Delegated Proof Of State Consensus, or Practical Byzantine Fault Tolerance). It is well-known to a person killed in the art that because a blockchain system operates based on a corresponding consensus algorithm, data recorded in the distributed database of the blockchain can hardly be tampered with by any node. For example, in a blockchain that uses the POW consensus algorithm, it takes at least 51% of the computing power of the entire network to tamper with existing data. Therefore, the blockchain system far exceeds other centralized database system in terms of data security guarantee and tamper-proof features. It can be seen that in the embodiments provided in the present specification, user state information data recorded in the distributed database of the blockchain shall not be attacked or tampered with, thereby ensuring the authenticity and impartiality of the data that is to be processed and that the data processing method provided in the present specification is based on. It is worthwhile to note that a node device described in the present specification can include a full node that stores the backup of all the data in the distributed database of the blockchain or can include a light node or a client device that stores the backup of some data in the distributed database of the blockchain. Implementations are not limited in the present specification.

In blockchain-based service processing, for example, house renting, car renting, and insurance claim settlement, state information of users who participate in the service processing are usually backed up in the distributed database of the blockchain. The state information of the target user described in some embodiments can include one or more types of the following information: name information of the target user, information about an organization that corresponds to the target user, or an eigenvalue that corresponds to the target user. The previous target transaction that includes the state information of the target user can be sent to the blockchain by a node device that corresponds to the target user or can be sent to the blockchain by a node device that corresponds to a user management organization that has relatively high credibility, for example, a server that corresponds to an enterprise employee management organization.

It is worthwhile to note that a transaction described in the present specification is a record of data that is created by a user by using a node or client device of a blockchain and that is finally published to the distributed database of the blockchain. Transactions in blockchains include transactions in a narrow sense and transactions in a broad sense. A transaction in a narrow sense is a value transfer published to a blockchain by a user. For example, in the conventional bitcoin blockchain network, a transaction can be a transfer initiated in a blockchain by a user. A transaction in a broad sense is a record of service data published to a blockchain by a user with a service purpose, for example, a record of data that includes the state information of the target user described in some embodiments. Or the previous data is organized based on a predetermined transaction data format to be converted into a transaction.

Step 104. Identify a data type of the state information and data content that corresponds to the data type.

In the blockchain-based data processing method provided in the present specification, corresponding data graphical processing methods are predetermined for data content of different data types. Therefore, before data graphical processing is performed, the data type of the state information that needs to be processed and the data content that corresponds to the data type need to be identified. Specific methods for identifying the previous state information are not limited in the present specification. For example, the corresponding data type and data content can be manually identified and then entered into a process of the data processing method. Alternatively, a machine model running in the node device can perform artificial intelligence-based identification to obtain the data type of the state information and the data content that corresponds to the data type.

Step 106. Perform graphical processing on the data content based on predetermined data graphical processing logic that corresponds to the data type, to obtain a state graphic that corresponds to the target user.

The process of performing data identification and data graphical processing on the state information of the target user described in step 104 and step 106 can be completed in a logical program that is deployed in the node device of the blockchain. Optionally, after completing the graphical processing on the state information of the target user, the node device that is of the blockchain and that performs the data graphical processing can transmit the obtained state graphic that corresponds to the state information the target user to an end-user device of the target user in a point-to-point transmission through an out-of-blockchain channel. As such, the end-user device of the target user serves as a node device of the blockchain and displays its user state more directly by using the previous state graphic in a service system that includes the node device of the previous blockchain and node devices of multiple users.

In another illustrated implementation, a smart contract for data graphical processing can be deployed on the blockchain after nodes on the blockchain reach a consensus. After obtaining the target transaction that includes the state information of the target user, any node device on the blockchain can invoke, based on the target transaction, the smart contract for data graphical processing, and execute data identification logic and data graphical processing logic that are declared in the smart contract to perform data identification and data graphical processing on the state information of the target user, to obtain the state graphic that corresponds to the target user.

A person skilled in art can readily figure out that a smart contract is invoked any time in response to publishing of a target transaction, thereby greatly improving efficiency in graphical processing of user state information. In addition, smart contacts have advantages of requiring little manual intervention and having no centralized authority, providing fair and unified execution logic for graphical processing of user state information of the blockchain.

The following uses specific user state information as examples to describe in detail the blockchain-based data processing methods provided in the present specification.

In an illustrated implementation, the state information of the target user includes name information of the organization that corresponds to the target user. The name information of the organization that corresponds to the target user described in some embodiments can be name information of an organization that the target user is currently affiliated with, can be name information of an organization that the target user used to be affiliated with, or can be name information of an organization that is obtained based on other mapping relationships.

The identifying a data type of the state information and data content that corresponds to the data type, and performing graphical processing on the data content based on predetermined data graphical processing logic that corresponds to the data type, to obtain a state graphic that corresponds to the target user includes: identifying, manually or by using a computer, the data type of organization name that corresponds to the target user and data content of the organization name; and performing graphical processing on the data content of the organization name based on predetermined data graphical processing logic that corresponds to the data type of organization name, to obtain a building graphic in the form of the first letter of the organization name and a name identifier that represents the organization.

Figure 2:
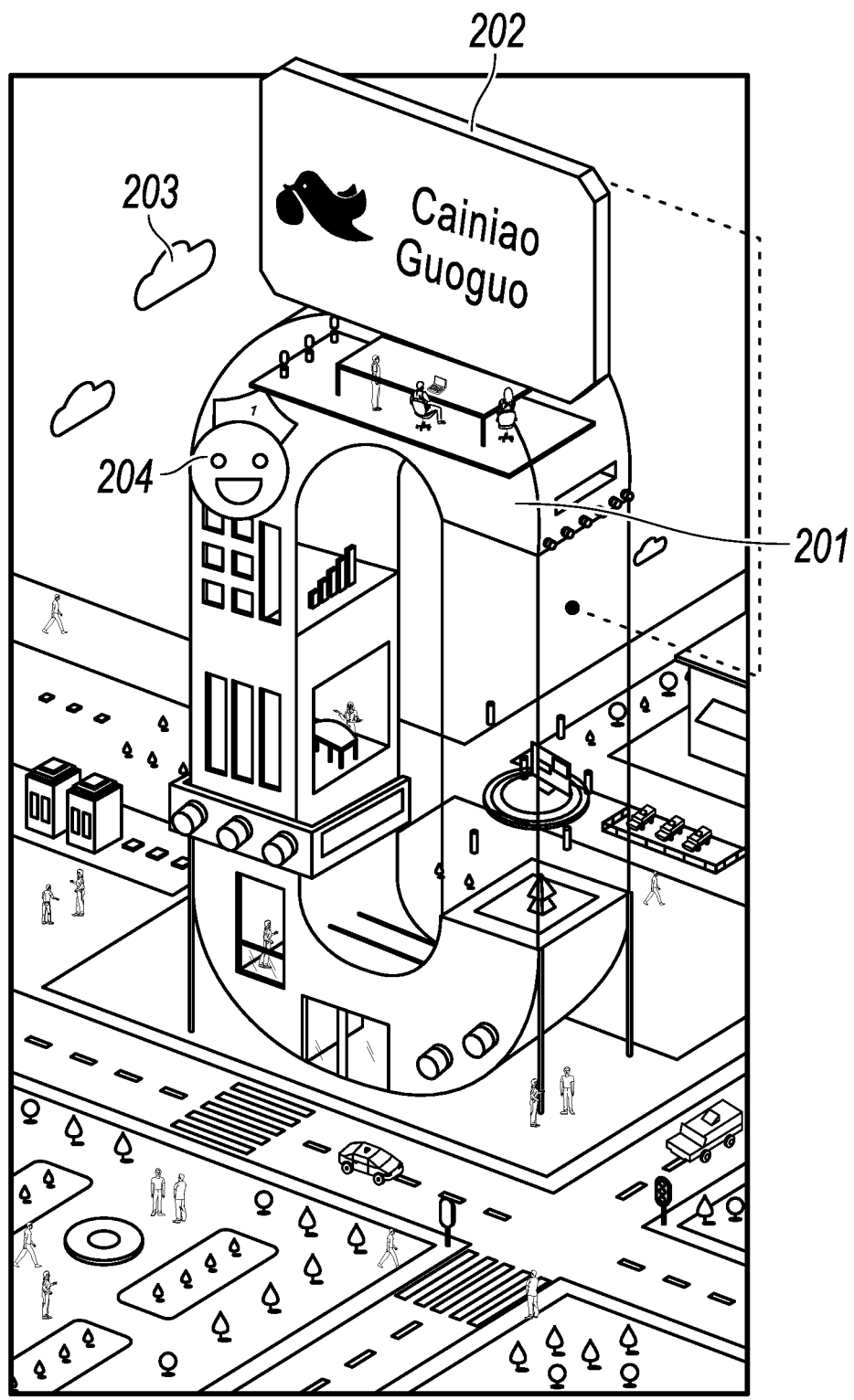
FIG. 2 illustrates a state graphic obtained by performing graphical processing on the information of an organization that corresponds to a target user, according to an embodiment of the present specification.

FIG. 2 illustrates a state graphic obtained by performing the data processing method provided in some embodiments on state information that is of target user "Zhang San" and that is obtained from the distributed database of the blockchain. For example, when the state information of the target user is "Zhang San, who is now an employee of Cainiao Guoguo Management Co., Ltd", it is obtained through data identification that the data type of the state information is organization name, and the data content is "Cainiao Guoguo Management Co., Ltd". Based on predetermined graphical processing logic that corresponds to the data type of organization name, the first letter of the organization name is processed into a building in the form of the corresponding letter, for example, "C"-shaped building 201 shown in FIG. 2; and a name identifier of the organization is marked at a predetermined location of the building, for example, identifier 202 shown in FIG. 2. As such, the state information "Zhang San, who is now an employee of Cainiao Guoguo Management Co., Ltd" of the target user is processed into the C-shaped building graphic and the "Cainiao Guoguo" icon on the C-shaped building that are shown in FIG. 2 so that other users can directly obtain the information of the organization that the target user Zhang San is affiliated with.

For another example, when the state information of the target user further includes "the scale of the company is 2000 employees", it is obtained through data identification that the data type of the state information is organization scale, and the data content is "2000 employees". Based on predetermined graphical processing logic that corresponds to the data type of organization scale, a corresponding population density form graphic is generated based on the data content of the organization scale. The corresponding population density form graphic in FIG. 2 includes forms of all the figures (including figures inside and outside the building) that appear in FIG. 2 so that other users directly obtains the personnel scale information of the organization that the target user Zhang San is affiliated with.

In another illustrated implementation, the state information of the target user further includes geographical location information that corresponds to the target user. The geographical location information that corresponds to the target user can be geographical location information of the organization that the target user is affiliated with, can be geographical location information that corresponds to the real-time IP address of the target user, or can be geographical location information that is related to a state of the target user and that is obtained by using other methods. Specific corresponding rules are not limited in the present specification.

Correspondingly, the process of identifying a data type of the state information and data content that corresponds to the data type, and performing graphical processing on the data content based on predetermined data graphical processing logic that corresponds to the data type, to obtain a state graphic that corresponds to the target user further includes the following steps:

identifying the data type of geographical location information and data content of the geographical location;

obtaining a real-time weather state of the geographical location based on the data content of the geographical location, where the weather state can be retrieved online by a node device that runs the data graphical processing logic; and processing the real-time weather state into a weather state graphic based on predetermined data graphical processing logic that corresponds to the data type of geographical location.

As shown in FIG. 2, when the geographical location corresponding to the target user is cloudy at the moment, the state graphic that corresponds to the state information of user Zhang San further includes the weather state graphic, for example, the weather state form denoted as 203.

In another illustrated implementation, the state information of the target user includes eigenvalue information of the target user, and the eigenvalue is used to represent credibility or activeness of the user. For example, when the target user participates in service activities of a service system that is constructed based on a blockchain, credibility or activeness of the target user in the service system are usually backed up on the blockchain. Graphical processing is performed on the credibility or activeness so that other users can directly determine the credibility or activeness of the target user from the state graphic that corresponds to the target user. Identifier "1" above the user profile denoted as icon 204 in FIG. 2 can represent the credibility or activeness of the target user or the ranking of the credibility or activeness in the corresponding service system.

Figure 4:
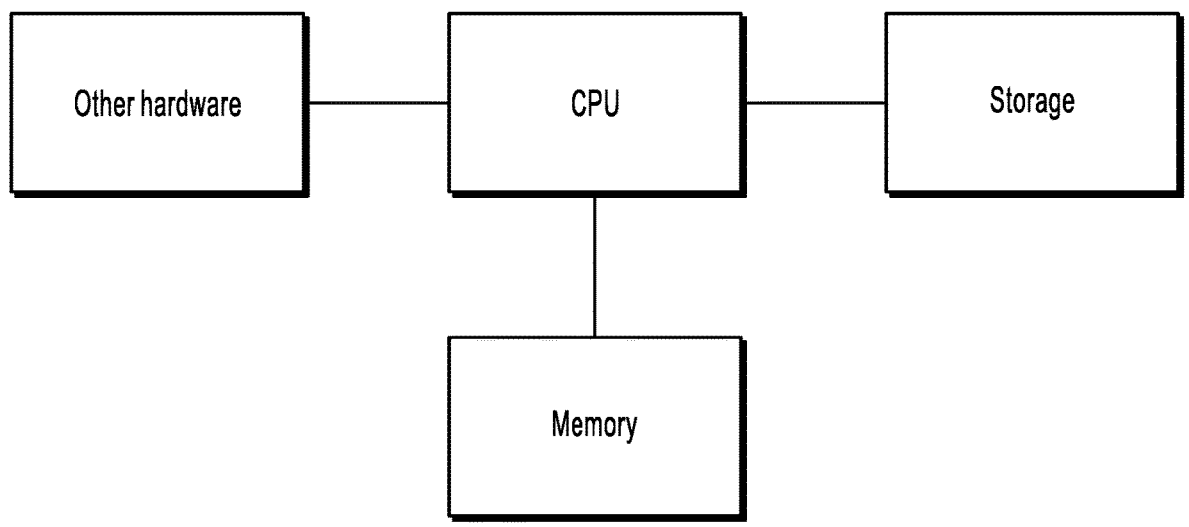
FIG. 4 is a structural hardware diagram of an embodiment of a blockchain-based data processing apparatus, according to the present specification.

Corresponding to the previous process implementations, the embodiments of the present specification further provide a blockchain-based data processing apparatus. The apparatus can be implemented by using software, hardware, or a combination of software and hardware. For example, the apparatus is implemented by using software. As a logical apparatus, the apparatus is formed by reading a corresponding computer program to a memory for execution by the central processing unit (CPU) of a device that the apparatus is located in. In terms of hardware, in addition to the CPU, memory, and storage shown in FIG. 4, a device that an apparatus for implementing network risk services is located in usually further includes other hardware, for example, at least one of a chip for wireless signal sending and receiving and a board for implementing network communication functions.

Figure 3:
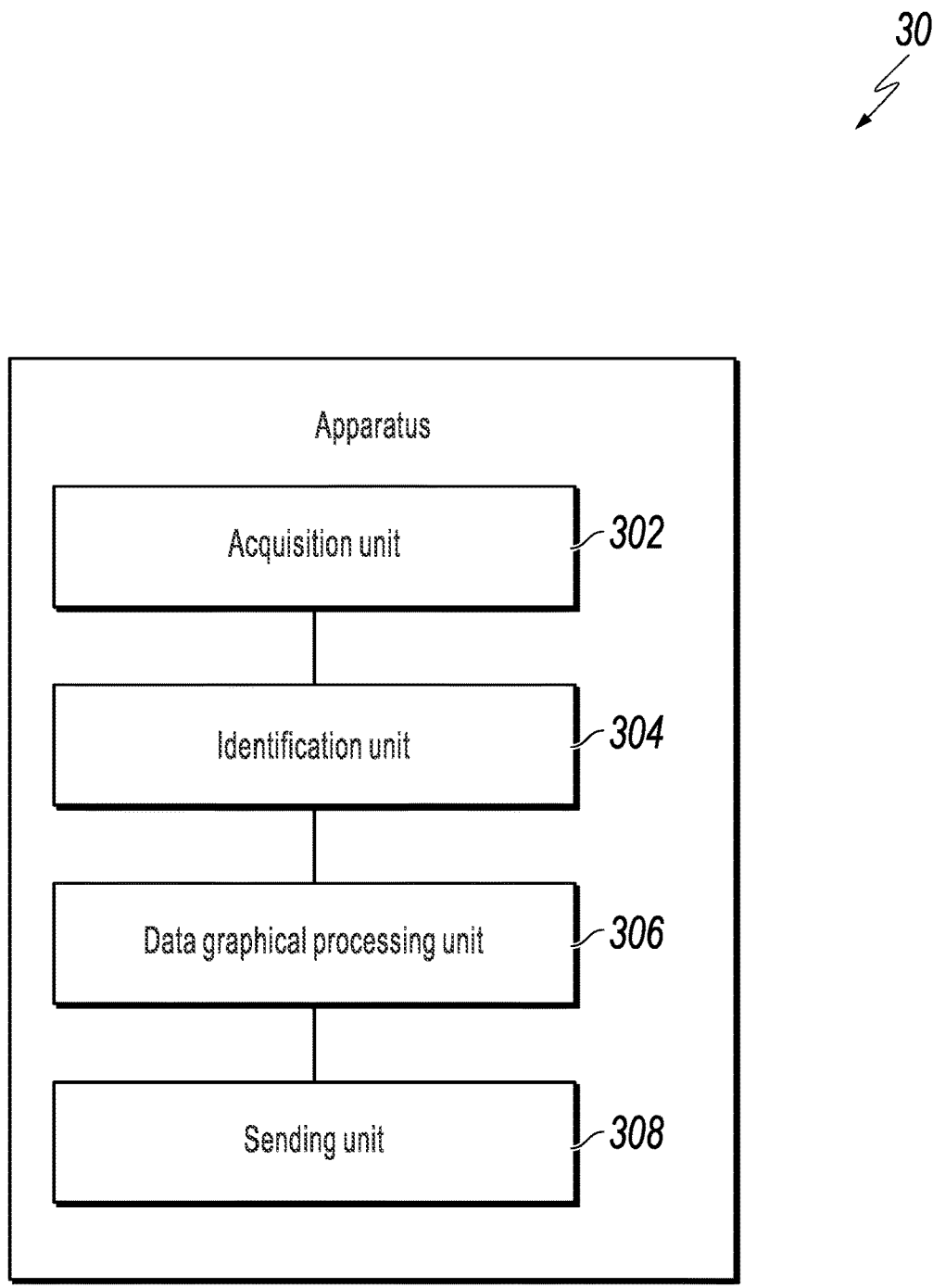
FIG. 3 is a schematic diagram illustrating a blockchain-based data processing apparatus, according to an embodiment of the present specification.

FIG. 3 shows a blockchain-based data processing apparatus 30, including:

an acquisition unit 302, configured to obtain, from a distributed database of a blockchain, a target transaction that includes state information of a target user;

an identification unit 304, configured to identify a data type of the state information and data content that corresponds to the data type; and a data graphical processing unit 306, configured to perform graphical processing on the data content based on predetermined data graphical processing logic that corresponds to the data type, to obtain a state graphic that corresponds to the target user.

In another illustrated implementation, the apparatus 30 further includes:

a sending unit 308, configured to send the state graphic to an end-user device of the target user, where the end-user device of the target user is a node device of the blockchain.

In another illustrated implementation, the identification unit 304 and the data graphical processing unit 306 are further configured to:

invoke a smart contract for data graphical processing, and execute data identification logic and data graphical processing logic that are declared in the smart contract to perform data identification and data graphical processing on the state information of the target user, to obtain the state graphic that corresponds to the target user.

In another illustrated implementation, the state information of the target user includes name information of an organization that corresponds to the target user; and the identification unit 304 and the data graphical processing unit 306 are further configured to:

identify the data type of organization name and data content of the organization name; and perform graphical processing on the data content of the organization name based on predetermined data graphical processing logic that corresponds to the data type of organization name, to obtain a building graphic in the form of the first letter of the organization name and a name identifier that represents the organization, where the state graphic that corresponds to the target user includes the building graphic and the name identifier.

In another illustrated implementation, the state information of the target user further includes scale information of the organization that corresponds to the target user; and the identification unit 304 and the data graphical processing unit 306 are further configured to:

identify the data type of organization scale and data content of the organization scale; and perform graphical processing on the data content of the organization scale based on predetermined data graphical processing logic that corresponds to the data type of organization scale, to obtain a population density form graphic that corresponds to the organization, where the state graphic that corresponds to the target user further includes the population density form graphic.

In another illustrated implementation, the state information of the target user further includes geographical location information that corresponds to the target user; and the identification unit 304 and the data graphical processing unit 306 are further configured to:

identify the data type of geographical location and data content of the geographical location;

obtain a real-time weather state of the geographical location; and process the real-time weather state into a weather state graphic based on predetermined data graphical processing logic that corresponds to the data type of geographical location, where the state graphic that corresponds to the target user further includes the weather state graphic.

In another illustrated implementation, the state information of the target user includes eigenvalue information of the target user, and the eigenvalue is used to represent credibility or activeness of the user.

For details about an implementation process of functions and roles of each unit in the apparatus, references can be made to an implementation process of corresponding steps in the previous method. For related parts, references can be made to related descriptions in the method embodiment. Details are omitted here.

The previously described apparatus embodiment is merely an example. The units described as separate parts can or does not have to be physically separate, and parts displayed as units can or cannot be physical modules, can be located in one position, or can be distributed on a plurality of network modules. Some or all of the units or modules can be selected based on actual needs to achieve the objectives of the solutions of the present specification. A person of ordinary skill in the art can understand and implement the implementations of the present specification without creative efforts.

The apparatus, unit, or module illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method embodiment, the embodiments of the present specification further provide a computer device. The computer device includes a storage and a processor. The storage stores a processor executable computer program, and when executing the stored computer program, the processor performs the steps in the blockchain-based data processing method in the embodiments of the present specification. For specific descriptions of the steps in the blockchain-based data processing method, reference can be made to the previous content. Details are omitted here.

The previous descriptions are only example embodiments of the present specification, but are not intended to limit the present specification. Any modification, equivalent replacement, improvement, etc. made without departing from the spirit and principle of the present specification shall fall within the protection scope of the present specification.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data.

Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a DVD, or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory computer readable media such as a modulated data signal and carrier.

It is worthwhile to further note that, the terms "include", "contain", or their any other variants are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that embodiments of the present specification can be provided as a method, a system, or a computer program product. Therefore, the embodiments of the present specification can use a form of hardware only embodiments, software only embodiments, or embodiments with a combination of software and hardware. Moreover, the embodiments of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:
obtaining, by a first node device of a blockchain and from a distributed database of the blockchain, a target transaction that comprises state information of a target user;
identifying a data type of the state information, data content that corresponds to the data type of the state information, a data type of a name of an organization, and data content that corresponds to the name of the organization;
performing a first graphical processing on the data content that corresponds to the data type of the state information to obtain a state graphic that corresponds to the target user, wherein the first graphical processing is performed based on first predetermined data graphical processing logic that corresponds to the data type of the state information; and
performing a second graphical processing based on the data content that corresponds to the name of the organization to obtain a building graphic in a form of a first letter of the name of the organization and a name identifier that represents the organization, wherein the second graphical processing is performed based on second predetermined data graphical processing logic that corresponds to the data type of the name of the organization, and wherein the state graphic that corresponds to the target user comprises the building graphic and the name identifier.

2. The computer-implemented method according to claim 1, comprising:
sending the state graphic to an end-user device of the target user, wherein the end-user device of the target user is a second node device of the blockchain.

3. The computer-implemented method according to claim 1, wherein identifying the data type of the state information and performing the first graphical processing on the data content that corresponds to the data type of the state information comprises:
invoking a smart contract for a data graphical processing; and
executing data identification logic and data graphical processing logic to obtain the state graphic that corresponds to the target user, wherein the data identification logic and the data graphical processing logic are declared in the smart contract to perform a data identification and the data graphical processing on the state information of the target user.

4. The computer-implemented method according to claim 1, wherein
the state information of the target user comprises name information of the organization that corresponds to the target user.

5. The computer-implemented method according to claim 1, wherein:
the state information of the target user comprises scale information of the organization that corresponds to the target user; and
identifying the data type of the state information and the data content that corresponds to the data type of the state information, and performing the first graphical processing on the data content that corresponds to the data type of the state information comprises:
identifying a data type of an organization scale and data content of the organization scale; and
performing a third graphical processing on the data content of the organization scale based on third predetermined data graphical processing logic that corresponds to the data type of the organization scale, to obtain a population density form graphic that corresponds to the organization, wherein the state graphic that corresponds to the target user comprises the population density form graphic.

6. The computer-implemented method according to claim 1, wherein:
the state information of the target user comprises geographical location information that corresponds to the target user; and
identifying the data type of the state information and the data content that corresponds to the data type of the state information, and performing the first graphical processing on the data content that corresponds to the data type of the state information comprises:
identifying a data type of a geographical location and data content of the geographical location;
obtaining a real-time weather state of the geographical location; and
processing the real-time weather state into a weather state graphic based on fourth predetermined data graphical processing logic that corresponds to the data type of the geographical location, wherein the state graphic that corresponds to the target user comprises the weather state graphic.

7. The computer-implemented method according to claim 1, wherein:
the state information of the target user comprises eigenvalue information of the target user; and
the eigenvalue information is used to represent credibility or activeness of the target user.

8. A non-transitory, computer-readable medium storing one or more instructions executable by a computer system to perform one or more operations comprising:
obtaining, by a first node device of a blockchain and from a distributed database of the blockchain, a target transaction that comprises state information of a target user;
identifying a data type of the state information, data content that corresponds to the data type of the state information, a data type of a name of an organization, and data content that corresponds to the name of the organization;
performing a first graphical processing on the data content that corresponds to the data type of the state information to obtain a state graphic that corresponds to the target user, wherein the first graphical processing is performed based on first predetermined data graphical processing logic that corresponds to the data type of the state information; and
performing a second graphical processing based on the data content that corresponds to the name of the organization to obtain a building graphic in a form of a first letter of the name of the organization and a name identifier that represents the organization, wherein the second graphical processing is performed based on second predetermined data graphical processing logic that corresponds to the data type of the name of the organization, and wherein the state graphic that corresponds to the target user comprises the building graphic and the name identifier.

9. The non-transitory, computer-readable medium according to claim 8, comprising:
sending the state graphic to an end-user device of the target user, wherein the end-user device of the target user is a second node device of the blockchain.

10. The non-transitory, computer-readable medium according to claim 8, wherein identifying the data type of the state information and performing the first graphical processing on the data content that corresponds to the data type of the state information comprises:
invoking a smart contract for a data graphical processing; and
executing data identification logic and data graphical processing logic to obtain the state graphic that corresponds to the target user, wherein the data identification logic and the data graphical processing logic are declared in the smart contract to perform a data identification and the data graphical processing on the state information of the target user.

11. The non-transitory, computer-readable medium according to claim 8, wherein
the state information of the target user comprises name information of the organization that corresponds to the target user.

12. The non-transitory, computer-readable medium according to claim 8, wherein:
the state information of the target user comprises scale information of the organization that corresponds to the target user; and
identifying the data type of the state information and the data content that corresponds to the data type of the state information, and performing the first graphical processing on the data content that corresponds to the data type of the state information comprises:
identifying a data type of an organization scale and data content of the organization scale; and
performing a third graphical processing on the data content of the organization scale based on third predetermined data graphical processing logic that corresponds to the data type of the organization scale, to obtain a population density form graphic that corresponds to the organization, wherein the state graphic that corresponds to the target user comprises the population density form graphic.

13. The non-transitory, computer-readable medium according to claim 8, wherein:
the state information of the target user comprises geographical location information that corresponds to the target user; and
identifying the data type of the state information and the data content that corresponds to the data type of the state information, and performing the first graphical processing on the data content that corresponds to the data type of the state information comprises:
identifying a data type of a geographical location and data content of the geographical location;
obtaining a real-time weather state of the geographical location; and
processing the real-time weather state into a weather state graphic based on fourth predetermined data graphical processing logic that corresponds to the data type of the geographical location, wherein the state graphic that corresponds to the target user comprises the weather state graphic.

14. The non-transitory, computer-readable medium according to claim 8, wherein:
the state information of the target user comprises eigenvalue information of the target user; and
the eigenvalue information is used to represent credibility or activeness of the target user.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a first node device of a blockchain and from a distributed database of the blockchain, a target transaction that comprises state information of a target user;
identifying a data type of the state information, data content that corresponds to the data type of the state information, a data type of a name of an organization, and data content that corresponds to the name of the organization;
performing a first graphical processing on the data content that corresponds to the data type of the state information to obtain a state graphic that corresponds to the target user, wherein the first graphical processing is performed based on first predetermined data graphical processing logic that corresponds to the data type of the state information; and
performing a second graphical processing based on the data content that corresponds to the name of the organization to obtain a building graphic in a form of a first letter of the name of the organization and a name identifier that represents the organization, wherein the second graphical processing is performed based on second predetermined data graphical processing logic that corresponds to the data type of the name of the organization, and wherein the state graphic that corresponds to the target user comprises the building graphic and the name identifier.

16. The computer-implemented system according to claim 15, comprising:
sending the state graphic to an end-user device of the target user, wherein the end-user device of the target user is a second node device of the blockchain.

17. The computer-implemented system according to claim 15, wherein identifying the data type of the state information and performing the first graphical processing on the data content that corresponds to the data type of the state information comprises:
invoking a smart contract for a data graphical processing; and
executing data identification logic and data graphical processing logic to obtain the state graphic that corresponds to the target user, wherein the data identification logic and the data graphical processing logic are declared in the smart contract to perform a data identification and the data graphical processing on the state information of the target user.

18. The computer-implemented system according to claim 15, wherein
the state information of the target user comprises name information of the organization that corresponds to the target user.

19. The computer-implemented system according to claim 15, wherein:
- the state information of the target user comprises scale information of the organization that corresponds to the target user; and
- identifying the data type of the state information and the data content that corresponds to the data type of the state information, and performing the first graphical processing on the data content that corresponds to the data type of the state information comprises:
  - identifying a data type of an organization scale and data content of the organization scale; and
  - performing a third graphical processing on the data content of the organization scale based on third predetermined data graphical processing logic that corresponds to the data type of the organization scale, to obtain a population density form graphic that corresponds to the organization, wherein the state graphic that corresponds to the target user comprises the population density form graphic.

20. The computer-implemented system according to claim 15, wherein:
- the state information of the target user comprises geographical location information that corresponds to the target user; and
- identifying the data type of the state information and the data content that corresponds to the data type of the state information, and performing the first graphical processing on the data content that corresponds to the data type of the state information comprises:
  - identifying a data type of a geographical location and data content of the geographical location;
  - obtaining a real-time weather state of the geographical location; and
  - processing the real-time weather state into a weather state graphic based on fourth predetermined data graphical processing logic that corresponds to the data type of the geographical location, wherein the state graphic that corresponds to the target user comprises the weather state graphic.

\* \* \* \* \*